US006950434B1

(12) United States Patent
Viswanath et al.

(10) Patent No.: US 6,950,434 B1
(45) Date of Patent: Sep. 27, 2005

(54) ARRANGEMENT FOR SEARCHING PACKET POLICIES USING MULTI-KEY HASH SEARCHES IN A NETWORK SWITCH

(75) Inventors: Somnath Viswanath, Sunnyvale, CA (US); Gopal Krishna, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/496,212

(22) Filed: Feb. 1, 2000

Related U.S. Application Data

(60) Provisional application No. 60/169,296, filed on Dec. 7, 1999.

(51) Int. Cl.[7] ......................... H04L 12/28; H04L 12/56
(52) U.S. Cl. ................................. 370/392; 370/395.32
(58) Field of Search ............................... 370/389, 392, 370/395.31, 395.32, 395.7; 211/216, 200

(56) References Cited

U.S. PATENT DOCUMENTS

| | | | | | |
|---|---|---|---|---|---|
| 5,386,413 | A | * | 1/1995 | McAuley et al. | 370/392 |
| 5,509,123 | A | * | 4/1996 | Dobbins et al. | 709/243 |
| 5,555,405 | A | * | 9/1996 | Griesmer et al. | 707/205 |
| 5,633,858 | A | * | 5/1997 | Chang et al. | 370/255 |
| 5,640,399 | A | * | 6/1997 | Rostoker et al. | 370/392 |
| 5,754,659 | A | * | 5/1998 | Sprunk et al. | 380/30 |
| 5,757,795 | A | * | 5/1998 | Schnell | 370/392 |
| 5,852,607 | A | * | 12/1998 | Chin | 370/401 |
| 5,949,786 | A | * | 9/1999 | Bellenger | 370/401 |
| 5,953,335 | A | | 9/1999 | Erimli et al. | |
| 5,978,951 | A | * | 11/1999 | Lawler et al. | 714/758 |
| 6,084,877 | A | * | 7/2000 | Egbert et al. | 370/389 |
| 6,091,725 | A | * | 7/2000 | Cheriton et al. | 370/392 |
| 6,118,760 | A | * | 9/2000 | Zaumen et al. | 370/229 |
| 6,157,641 | A | * | 12/2000 | Wilford | 370/389 |
| 6,212,183 | B1 | * | 4/2001 | Wilford | 370/392 |
| 6,243,667 | B1 | * | 6/2001 | Kerr et al. | 703/27 |
| 6,473,400 | B1 | * | 10/2002 | Manning | 370/229 |

OTHER PUBLICATIONS

Newton, Harry. Newton's Telecom Dictionary. 18th ed. p. 414: "Key".*

* cited by examiner

*Primary Examiner*—Huy D. Vu
*Assistant Examiner*—Daniel Ryman
(74) *Attorney, Agent, or Firm*—Manelli Denison & Selter PLLC; Leon R. Turkevich

(57) ABSTRACT

A network switch, configured for performing layer 2 and layer 3 switching in an Ethernet (IEEE 802.3) network without blocking of incoming data packets, includes network switch ports, each including a flow module configured for generating a packet signature based on layer 3 information within a received data packet. The flow module generates first and second hash keys according to a prescribed hashing function upon obtaining first and second portions of layer 3 information. The flow module combines the first and second hash keys to form the packet signature, and searches an on-chip signature table that indexes addresses of layer 3 switching entries by entry signatures, where the entry signatures are generated using the same prescribed hashing function on the first and second layer 3 portions of the layer 3 switching entries.

20 Claims, 4 Drawing Sheets

ARRANGEMENT FOR SEARCHING PACKET POLICIES USING MULTI-KEY HASH SEARCHES IN A NETWORK SWITCH

This application claims priority from Provisional Application No. 60/169,296, filed Dec. 7, 1999.

BACKGROUND OF THE INVENTION

1. Field of the Invention

The present invention relates to layer 2 and layer 3 switching of data packets in a non-blocking network switch configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1 q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 switching and layer 3 switching capabilities for faster speed networks such as 100 Mbps or gigabit networks.

However, such design requirements risk loss of the non-blocking features of the network switch, as it becomes increasingly difficult for the switching fabric of a network switch to be able to perform layer 3 processing at the wire rates (i.e., the network data rate). For example, switching fabrics in layer 2 switches require only a single hash key to be generated from a MAC source address and/or a MAC destination address of an incoming data packet to determine a destination output port; the single hash key can be used to search an address lookup table to identify the output port. Layer 3 processing, however, requires implementation of user-defined policies that include searching a large number of fields for specific values. These user-defined policies may specify what type of data traffic may be given priority accesses at prescribed intervals; for example, one user defined policy may limit Internet browsing by employees during work hours, and another user-defined policy may assign a high priority to e-mail messages from corporate executives. Hence, the number of such user policies may be very large, posing a substantial burden on performance of layer 3 processing at the wire rates.

SUMMARY OF THE INVENTION

There is a need for an arrangement that enables a network switch to provide layer 2 switching and layer 3 switching capabilities for 100 Mbps and gigabit links without blocking of the data packets.

There is also a need for an arrangement that enables a network switch to provide layer 2 switching and layer 3 switching capabilities with minimal buffering within the network switch that may otherwise affect latency of switched data packets.

There is also a need for an arrangement that enables a network switch to perform multiple key searches to provide layer 3 processing for multiple user-defined policies at the network wire rate.

There is also need for arrangement that enables data packets to undergo layer 3 processing in real time using a network switch that supports user-defined policies while operating at the wire rate.

These and other needs are attained by the present invention, where a network switch includes network switch ports, each including a flow module configured for generating a packet signature based on layer 3 information within a received data packet. The flow module generates first and second hash keys according to a prescribed hashing function upon obtaining first and second portions of layer 3 information, for example any two of IP source or destination address, transmission control protocol (TCP) source or destination port, or user datagram protocol (UDP) source or destination port. The flow module combines the first and second hash keys to form the packet signature, and searches an on-chip signature table that indexes addresses of layer 3 switching entries by entry signatures, where the entry signatures are generated using the same prescribed hashing function on the first and second layer 3 portions of the layer 3 switching entries. Hence, each network switch port can search for layer 3 switching information in real time as the data packet is received, enabling layer 3 switching logic within the network switch to execute the necessary layer 3 switching decision for the data packet based on the corresponding layer 3 switching entry identified by the network switch port.

One aspect of the present invention provides a method in a network switch of searching for a selected layer 3 switching entry for a received data packet. The method includes generating first and second hash keys according to a prescribed hash function in response to first and second layer 3 information within the received data packet, respectively, combining the first and second hash keys according to a prescribed combination into a signature for the received data packet, and searching a table. The table is configured for storing layer 3 signatures that index respective layer 3 switching entries according to the prescribed hash function and the prescribed combination. The table is searched for the selected layer 3 switching entry based on a match between the corresponding layer 3 signature and the signature for the received data packet. Generation of the signature from at least two hash keys for searching of the table enables search operations, normally requiring multiple key searches, to be reduced in hardware to a single search operation, dramatically improving the speed of the search operation. Moreover, the generation of the hash keys using first and second layer 3 information enables layer 3 processing to be performed in real time in a network switch, while maintaining flexibility for programming of the layer 3 switch by searching the layer 3 signatures that index the layer 3 switching entries.

Another aspect of the present invention provides a method of identifying a layer 3 switching decision within an integrated network switch having a plurality of network ports and switching logic. The method includes storing, in a first table, layer 3 switching entries that identify data packet types based on layer 3 information, respectively, each layer 3 switching entry identifying a corresponding layer 3 switching decision to be performed by the integrated network switch. An entry signature is generated for each of the layer 3 switching entries based on a prescribed hash operation performed on first and second portions of the corresponding layer 3 information. The method also includes generating a packet signature by a network port for a data packet at the network port based on performing the prescribed hash operation on the first and second portions of the layer 3 information in the corresponding received data packet. The network port identifies one of the layer 3 switching entries for switching of the received data packet based on detecting a match between the packet signature and the corresponding entry signature. Generation of the entry signature based on portions of the layer 3 information for each corresponding layer 3 switching entry enables a single key to be used for searching for the appropriate layer 3 switching entry by a network switch port. Hence, the identification of the layer 3 switching entry by the network switch port provides distributed processing, enabling the switching logic to perform layer 3 switching operations in real time.

Still another aspect of the present invention provides an integrated network switch configured for executing layer 3 switching decisions. The network switch includes an index table that includes addresses of layer 3 switching entries that identify respective data packet types based on layer 3 information, the index table also including for each address entry a corresponding entry signature representing a combination of selected first and second portions of the corresponding layer 3 information hashed according to a prescribed hashing operation. The network switch also includes a plurality of network switch ports, each comprising a frame identifier configured for obtaining the first and second portions of layer 3 information within a data packet being received by the network switch port, and a flow module. The flow module is configured for generating a packet signature by generating first and second hash keys for the first and second portions from the data packet based on a prescribed hash operation, the flow module identifying one of the layer 3 switching entries for execution of the corresponding layer 3 switching decision for the data packet based on a determined correlation between the packet signature and the corresponding entry signature. The network switch also includes layer 3 switching logic for executing the layer 3 switching decision for the data packet based on the corresponding identified one layer 3 switching entry.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
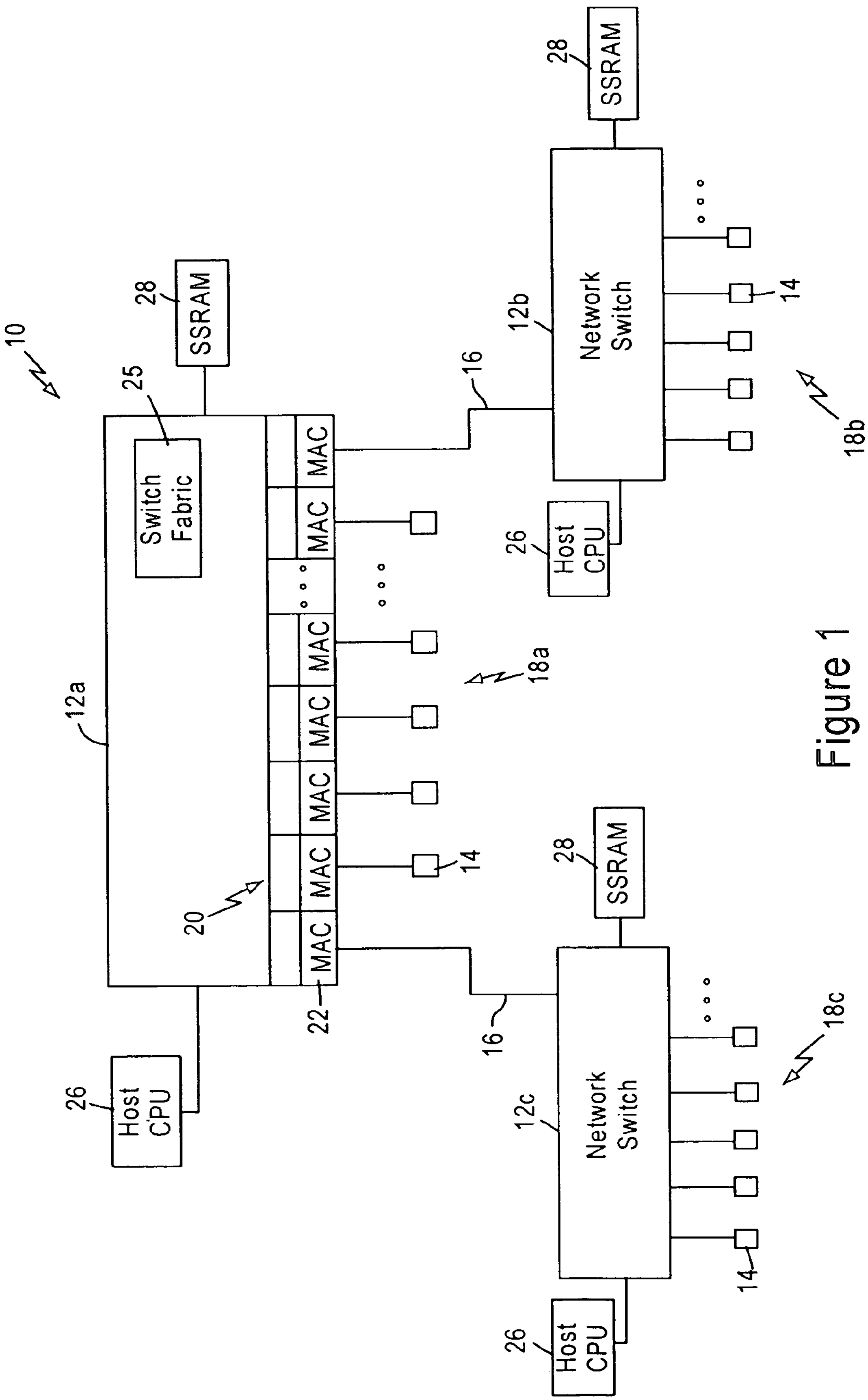
FIG. 1 is a block diagram of a packet switched network including multiple network switches for switching data packets between respective subnetworks according to an embodiment of the present invention.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks **18*a*, 18*b*, and 18*c*. Hence, each subnetwork includes a switch 12, and an associated group of network stations 14**.

Each switch 12 includes a switch port 20 that includes a media access control (MAC) module 22 that transmits and receives data packets to the associated network stations 14 across 10/100 Mbps physical layer (PHY) transceivers (not shown) according to IEEE 802.3u protocol. Each switch 12 also includes a switch fabric 25 configured for making frame forwarding decisions for received data packets. In particular, the switch fabric 25 is configured for layer 2 switching decisions based on source address, destination address, and VLAN information within the Ethernet (IEEE 802.3) header; the switch fabric 25 is also configured for selective layer 3 switching decisions based on evaluation of an IP data packet within the Ethernet packet.

As shown in FIG. 1, each switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets.

As described above, the switch fabric 25 is configured for performing layer 2 switching decisions and layer 3 switching decisions. The availability of layer 3 switching decisions may be particularly effective if an end station 14 within subnetwork **18*a* wishes to send an e-mail message to selected network stations in subnetwork 18*b*, 18*c*, or both; if only layer 2 switching decisions were available, then the switch fabric 25 of switch 12*a* would send the e-mail message to switches 12*b* and 12*c* without specific destination address information, causing switches 12*b* and 12*c* to flood all their ports. Otherwise, the switch fabric 25 of switch 12***a* would need to send the e-mail message to a router (not shown), which would introduce additional delay. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice. Use of layer 3 switching decisions by the switch fabric 25 also enables the host CPU 26 of switch 12*a* to remotely program another switch, for example switch 12*b*, by sending a message having an IP address corresponding to the IP address of the switch 12*b*; the switch 12*b*, in response to detecting a message addressed to the switch 12*b*, can forward the message to the corresponding host CPU 26 for programming of the switch 12*b*.

According to the disclosed embodiment, each switch port 20 of FIG. 1 is configured for performing layer 3 processing that identifies for the switching fabric 25 a selected layer 3 switching entry, enabling the switching fabric 25 in response to execute the appropriate layer 3 switching decision corresponding to the identified layer 3 switching entry. Specifically, users of the host processor 26 will specify policies that define how data packets having certain IP protocols should be handled by the switch fabric 25. These policies are implemented by loading into the switch fabric 25 a set of layer 3 switching decisions for each corresponding layer 3 switching entry; in other words, each layer 3 switching entry has a corresponding unique set of address values, for example specific values for a IP source address, an IP destination address, a transmission control protocol (TCP) source port, a TCP destination port, a user datagram protocol (UDP) source port, and/or a UDP destination port. Given these address fields within the layer 3 header, a set of layer 3 switching decisions can be established for each set of unique address fields. However, implementing a layer 3 lookup within the switch fabric 25 would impose extremely heavy processing requirements on the switch fabric 25, preventing the switch fabric 25 from performing layer 3 processing in real-time. In particular, the switch fabric 25 would need to perform multiple key searches for each of the address fields (IP source and destination address, TCP source and destination port, UDP source and destination port) in order to uniquely identify the specific layer 3 switching decision corresponding to the unique combination of the layer 3 address fields in a received data packet.

According to the disclosed embodiment, the network switch port 20 is configured for generating a multi-key packet signature to be used as a search key for searching of a layer 3 switching entry for the received data packet. Specifically, the network switch port 20 generates multiple hash keys based on the four parameters in every packet, namely IP source address, IP destination address, TCP/UDP source port, and TCP/UDP destination port. These hash keys are combined to form the packet signature, which is then compared by the network switch port 20 with precomputed entry signatures to determine possible matches. The layer 3 switching entries are stored in addresses that are a function of the corresponding entry signature, hence the network switch port 20 can identify the selected layer 3 switching entry that should be used for layer 3 switching decisions based on a match between the corresponding entry signature and the packet signature. The network switch port 20 can then forward the identification of the selected layer 3 switching entry to the switch fabric 25 for execution of the corresponding layer 3 switching decision.

Figure 2:
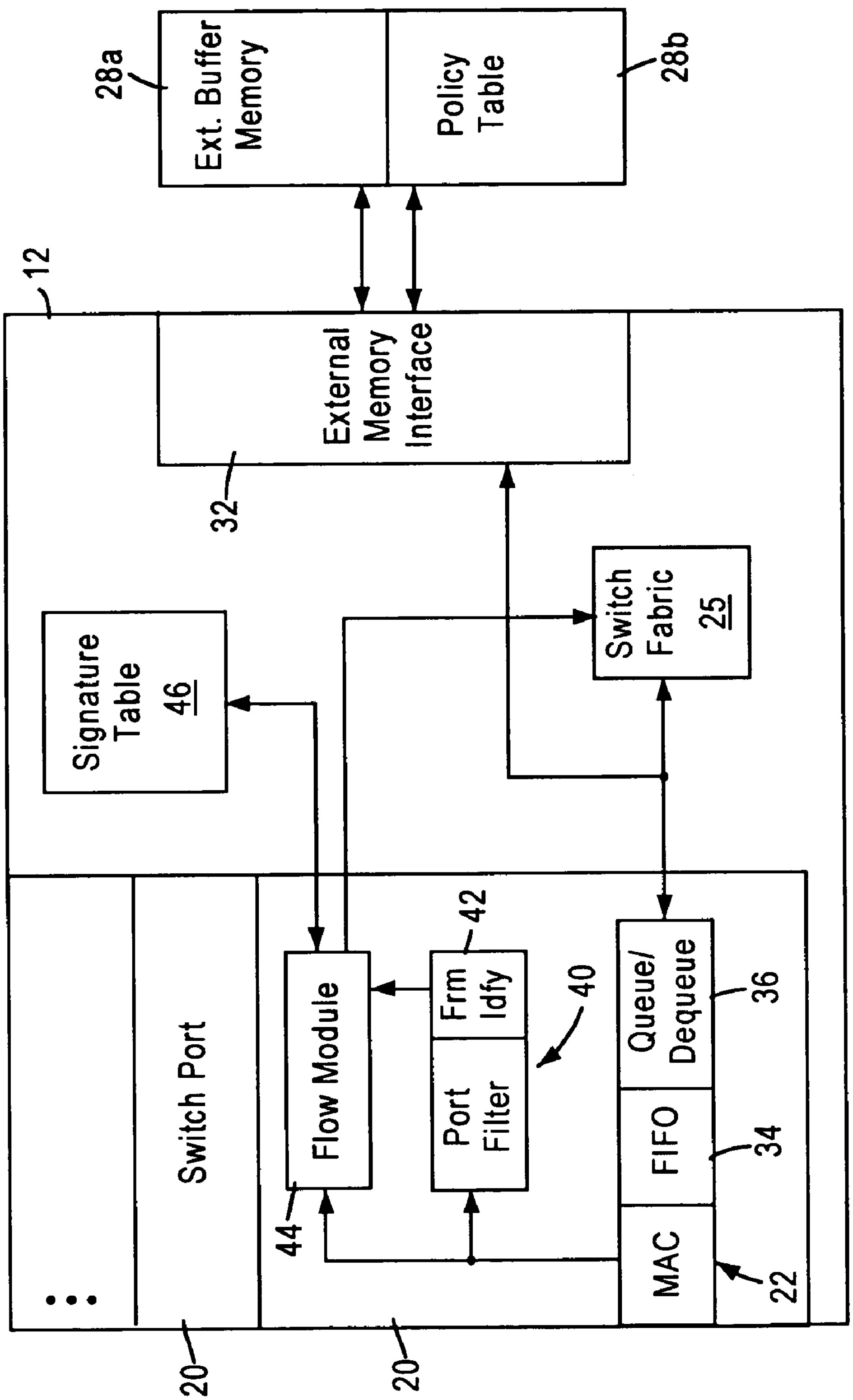
FIG. 2 is a block diagram illustrating in detail the network switch of FIG. 1 according to an embodiment of the present invention.

FIG. 2 is a block diagram illustrating the network switch 12 according to an embodiment of the present invention. The network switch includes a plurality of network switch ports 20, a switch fabric 25, also referred to as an internal rules checker (IRC), that performs the layer 3 switching decisions, at least one signature table 46 configured for storing addresses and signatures of layer 3 switching entries, and an external memory interface 32 configured for providing access to layer 3 switching entries stored within the external memory 28. In particular, the external memory 28 includes an external buffer memory 28*a* for storing the frame data, and a policy table 28*b* configured for storing the layer 3 switching entries at the prescribed addresses, described below. Although shown as a single memory 28, the external buffer memory 28*a* and the policy table 28*b* may be implemented as separate, discrete memory devices having their own corresponding memory interface 32 in order to optimize memory bandwidth.

The network switch port 20 includes a MAC portion 22 that includes a transmit/receive FIFO buffer 34 and queuing and dequeuing logic 36 for transferring layer 2 frame data to and from the external buffer memory 28*a*, respectively.

The network switch port 20 also includes a port filter 40 that includes a frame identifier 42. The port filter 40 is configured for performing various layer 3 processing, for example identifying whether the incoming data packet includes a layer 3 IP datagram. The frame identifier 42 is configured for identifying the beginning of the IP frame, and locating the layer 3 address entries as the IP frame is received from the network. In particular, the frame identifier identifies the start position of the IP source address, IP destination address, TCP/UDP source port, and TCP/UDP destination port as the data is being received. The network switch port 20 also includes a flow module 44 configured for generating a packet signature using at least two (preferably all four) layer 3 address entries as their start position is identified by the frame identifier 42. In particular, the flow module 44 monitors the incoming data stream, and obtains the IP source address, IP destination address, TCP/UDP source port, and TCP/UDP destination port in response to start position signals output by the frame identifier 42.

The flow module 44, in response to obtaining the layer 3 address fields IP source address, IP destination address, TCP/UDP source port, and TCP/UDP destination port, generates for each of the layer 3 address fields a hash key using a prescribed hashing operation, e.g., a prescribed hash polynomial. The flow module 44 then combines the four hash keys to form a packet signature. The packet signature is then compared with precomputed signatures for the layer 3 switching entries in the policy table 28*b*.

The signature table 46 serves as an index between the flow module 44 and the policy table 28*b* to optimize the search speed by the flow module 44. In particular, the signature table 46 within the network switch 12 stores the addresses of the layer 3 switching entries within the policy table 28*b*, and a corresponding entry signature. The entry signature represents a combination of hash keys that are generated based on the corresponding layer 3 information (IP source address, IP destination address, TCP/UDP source port, and TCP/UDP destination port) in the layer 3 switching entries, using the same hashing algorithm (i.e., the same hash polynomials) that is used by the flow module 44 in generating the packet signature. Hence, the packet signature is used to search the signature table 46 for a matching entry signature. Once a matching entry signature has been found, the flow module 44 accesses the policy table 28*b* using the corresponding address to obtain the layer 3 switching entry. The flow module 44 then verifies that the accessed layer 3 switching entry matches the received data packet, and upon detecting a match supplies the identification information to the switching fabric 25 for execution of the corresponding layer 3 switching decision.

Figure 3:
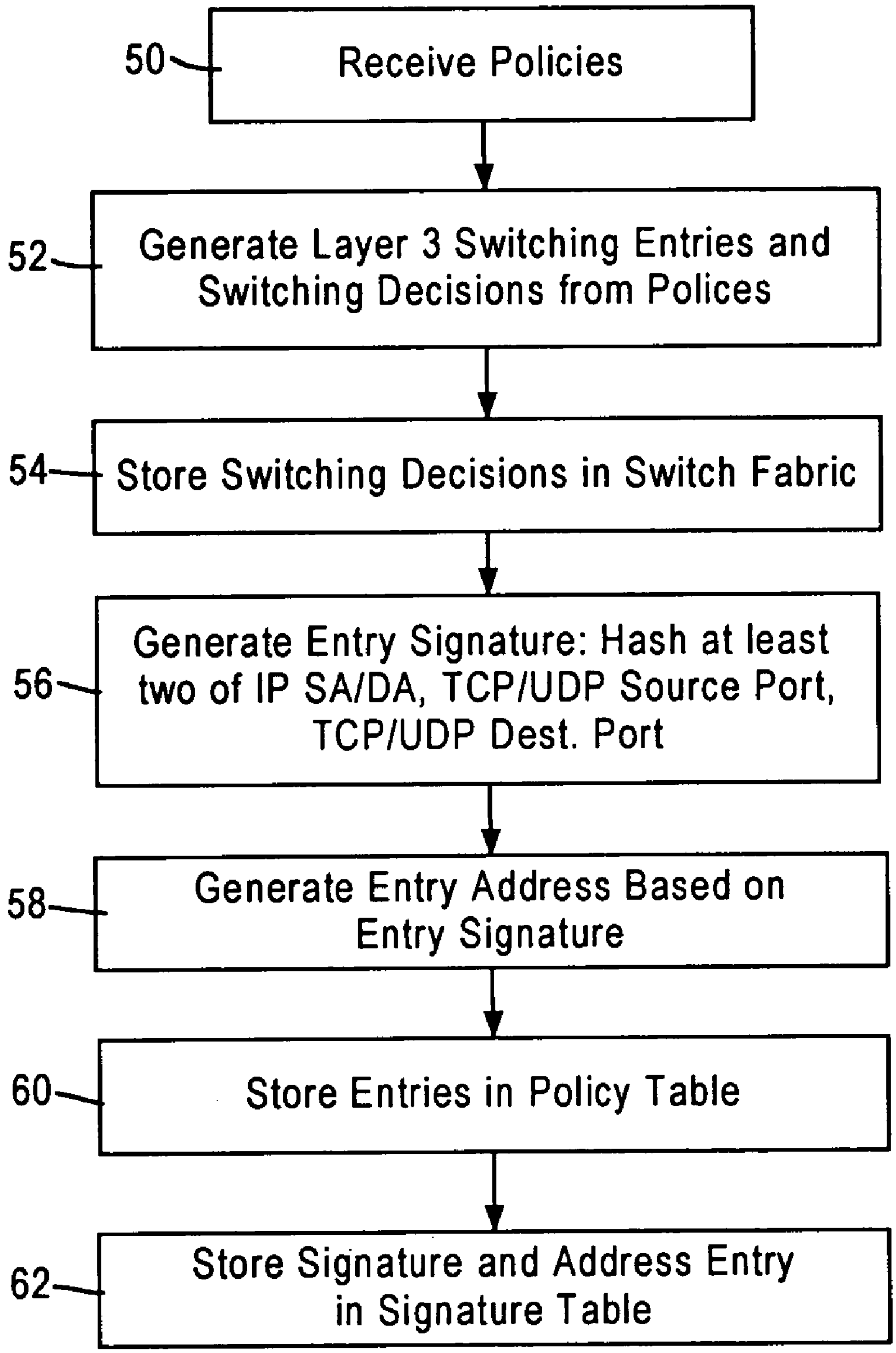
FIG. 3 is a diagram illustrating the storage of layer 3 switching entries and respective entry signatures for lookup processing by the network switch port according to an embodiment of the present invention.

FIG. 3 is a diagram illustrating in detail the method of storing layer 3 switching entries and respective entry signatures for lookup processing by the network switch port according to an embodiment of the present invention. A user such as a network programmer first programs policies to be followed for routing data traffic. For example, one user defined policy may limit Internet browsing by employees during work hours, and another user-defined policy may assign a high priority to e-mail messages from corporate executives, yet another user-defined policy could assign high priority to engineering traffic in a corporate intranet.

The host CPU 26 receives these policies in step 50 and generates layer 3 switching entries and respective layer 3 switching decisions from the policies in step 52 using network design software. In particular, the layer 3 switching entries include the layer 3 address information (e.g., IP source address, IP destination address, TCP/UDP source port, and TCP/UDP destination port) used to uniquely identify a layer 3 packet source and/or a layer 3 packet destination. Each layer 3 switching entry will have a corresponding switching decision that specifies the manner in which the corresponding IP packet should be switched, for example whether the IP packet should be given high priority status, low priority status, or whether the IP packet should be dropped to block further transmission (e.g., prohibited access).

The host CPU 26 then programs the layer 3 switching decisions into the switch fabric 25 in step 54, and generates entry signatures for the respective layer 3 switching entries in step 56. Specifically, the host CPU 26 uses a software based hashing function to generate hash keys for each of the IP source address, IP destination address, TCP/UDP source port, and TCP/UDP destination port address entries. The host CPU 26 then combines the hash keys using an OR operation to generate a single entry signature for each layer 3 switching entry. Typically each hash key will have a length of 12 to 16 bits, hence the entry signature has a length of about 48 to 64 bits.

The host CPU 26 then generates an entry address for each layer 3 switching entry in step 58 as a function of the corresponding entry signature. The layer 3 switching entries are then stored by the host CPU into the policy table 28*b* in step 60 based on the generated entry addresses. Once the layer 3 switching entries have been loaded into the policy table 28*b*, the host CPU stores the address entries and the respective entry signatures into the signature table 46 in step 62.

Once the switch fabric 25, the policy table 28*b*, and the signature table 46 have been loaded with the appropriate entries by the host CPU 26, switching operations can begin by the network switch 12.

Figure 4:
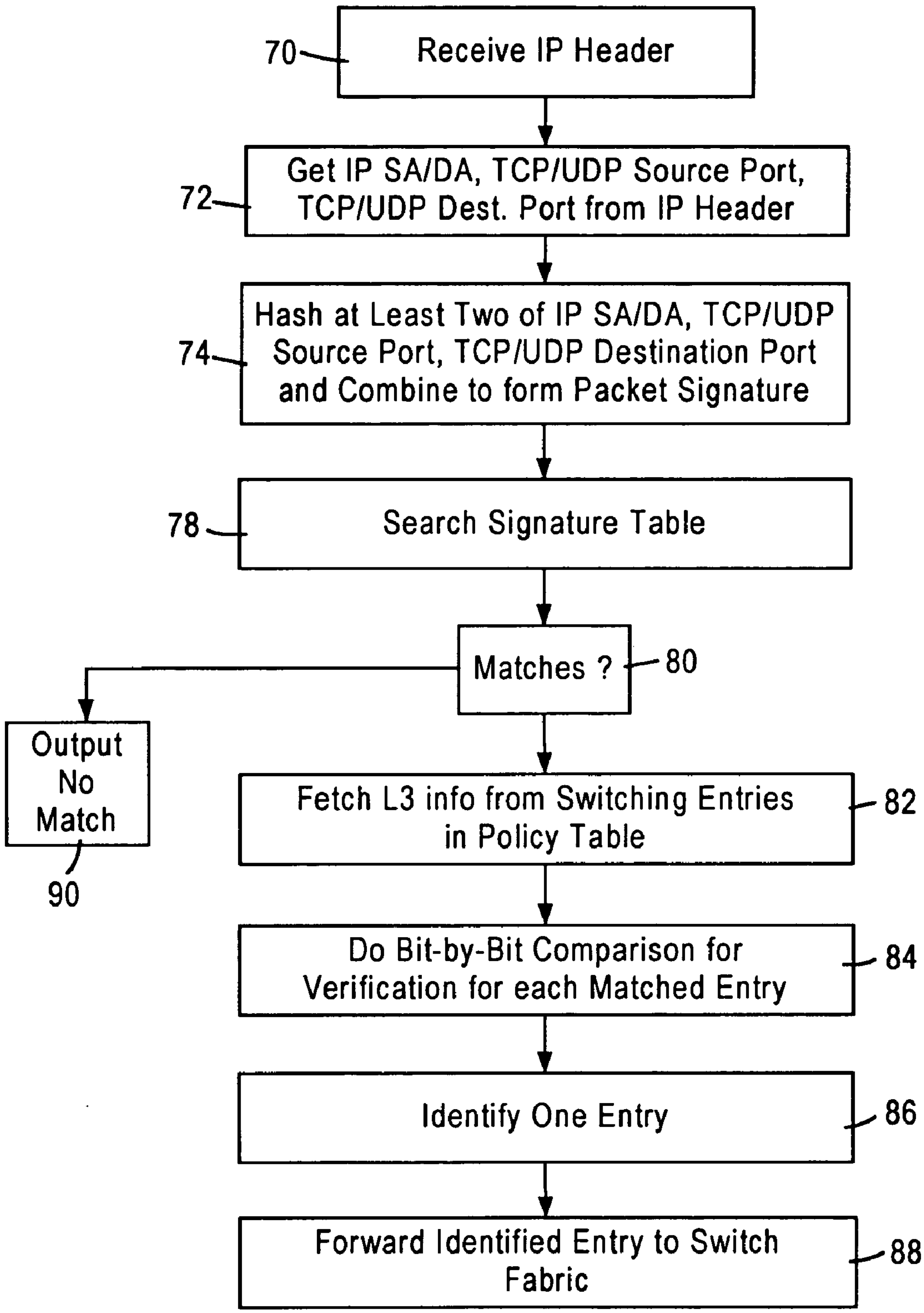
FIG. 4 is a diagram illustrating the method of identifying a layer 3 switching decision by a network switch port according to an embodiment of the present invention.

FIG. 4 is a diagram illustrating the method by each switch port 20 in searching for a selected layer 3 switching entry and identifying a layer 3 switching decision according to an embodiment of the present invention. The port filter 40 and the flow module 44 receive the IP header of an incoming data packet in step 70. The frame identifier 42 identifies the beginning of the IP frame (and optionally extracts the layer 3 address information), enabling the flow module 44 to obtain the layer 3 address information including the IP source address, IP destination address, TCP/UDP source port, and TCP/UDP destination port in step 72.

The flow module 44 then generates hash keys for each of the IP source address, IP destination address, TCP/UDP source port, and TCP/UDP destination port retrieved from the IP frame, and combines the hash keys together using an OR operation to generate the packet signature in step 74. Note that a packet signature and entry signature may be generated using as little as two hash keys, depending on the requirements of the network in performing layer 3 processing.

The flow module 44 then searches the signature table 46 in step 78 to determine whether the generated packet signature matches any of the stored entry signatures. If in step 80 there are no matches, then the flow module 44 outputs a tag to the switching fabric 25 in step 90 indicating that there were no layer 3 matches.

If in step 80 there are one or multiple matches detected by the flow module 44, then the flow module 44 verifies that one of the entries from the layer 3 switching entries matches the received data packet. In particular, the flow module 44 fetches in step 82 the layer 3 information from the layer 3 address entries stored in the policy table 28*b* having the matched entry signatures. The flow module 44 then performs a bit-by-bit comparison of the selected layer 3 address fields of each accessed layer 3 switching entry and the layer 3 address fields of the received data packet in step 84. Hence, the flow module 44 identifies one of the layer 3 switching entries as a match with the received data packet in step 86 based on the final bit-by-bit comparison of the layer 3 address information. The flow module 44 and forwards the identified entry (e.g., by forwarding the address value) to the switching logic 25 enabling the layer 3 switching logic to execute the layer 3 switching decision that corresponds to the identified layer 3 switching entry matching the data packet.

According to the disclosed embodiment, a network switch 12 is able to efficiently search for layer 3 switching information by using a packet signature as a search key, enabling switching logic decisions encompassing multiple address fields to be searched within a single search operation. Hence, layer 3 switching decisions can be performed in real-time, while providing sufficient flexibility that the network switch can be easily programmed or updated as necessary without complete reconfiguration of the switch.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network switch of searching for a selected layer 3 switching entry for a received data packet, the method comprising:

generating first and second hash keys according to a prescribed hash function in response to first and second layer 3 information within the received data packet, respectively;

combining the first and second hash keys according to a prescribed combination into a signature for the received data packet; and searching, by the network switch, a table, configured for storing layer 3 signatures that index respective layer 3 switching entries according to the prescribed hash function and the prescribed combination, for the selected layer 3 switching entry based on a match between the corresponding layer 3 signature and the signature for the received data packet.

2. The method of claim 1, wherein received data packet includes an Internet Protocol (IP) header, the generating step including detecting the first and second layer 3 information from the IP header as the data packet is received by a corresponding network switch port.

3. The method of claim 2, wherein the detecting step includes selecting at least two of an IP source address, an IP destination address, a Transmission Control Protocol (TCP) source port, a TCP destination port, a User Datagram Protocol (UDP) source port, and a UDP destination port as the first and second layer 3 information from the IP header based on elements of each of the layer 3 switching entries used to generate the corresponding layer 3 signature.

4. The method of claim 1, further comprising verifying whether the selected layer 3 switching entry matches the received data packet.

5. The method of claim 4, wherein the verifying step includes:

fetching the first and second layer 3 information from the selected layer 3 switching entry; and determining whether the first and second layer 3 information from the selected layer 3 switching entry matches the first and second layer 3 information within the received data packet.

6. The method of claim 1, further comprising:

detecting a group of the layer 3 switching entries, each having a corresponding layer 3 signature that matches the signature for the received data packet; and verifying one entry from the group of the layer 3 switching entries matches the received data packet.

7. The method of claim 6, wherein the verifying step includes:

fetching the first and second layer 3 information for each of the entries of the group of layer 3 switching entries; and identifying the one entry having the corresponding first and second layer 3 information that matches the first and second layer 3 information within the received data packet.

8. The method of claim 7, wherein the network switch is an integrated circuit chip, the searching step including searching a signature table located on the integrated circuit chip, and the fetching step including accessing the first and second layer 3 information from a policy table in a memory external to the integrated circuit chip.

9. The method of claim 1, further comprising forwarding an identifier specifying the selected layer 3 switching entry from a network switch port, having received the received data packet, to layer 3 switching logic within the network switch.

10. The method of claim 1, wherein the network switch and the table are implemented on a single chip, the generating first and second hash keys, the combining the first and second hash keys, and the searching the table each being performed by the network switch.

11. A method of identifying a layer 3 switching decision within an integrated network switch having a plurality of network switch ports and switching logic, the method including:

storing, in a first table, layer 3 switching entries that identify data packet types based on layer 3 information, respectively, each layer 3 switching entry identifying a corresponding layer 3 switching decision to be performed by the integrated network switch;

generating an entry signature for each of the layer 3 switching entries based on a prescribed hash operation performed on first and second portions of the corresponding layer 3 information based on:

(1) generating first and second hash keys for the first and second portions of the corresponding layer 3 information in the layer 3 switching entry based on the prescribed hash operation; and (2) combining the first and second hash keys to form the entry signature;

generating a packet signature by a network switch port of the integrated network switch for a data packet received at the network switch port based on performing the prescribed hash operation on the first and second portions of the layer 3 information in the corresponding received data packet; and identifying by the network switch port one of the layer 3 switching entries for switching of the received data packet based on detecting a match between the packet signature and the corresponding entry signature;

wherein the integrated network switch is implemented on a single chip.

12. The method of claim 11, wherein the step of generating an entry signature includes:

selecting at least two of an IP source address, an IP destination address, a Transmission Control Protocol (TCP) source port, a TCP destination port, a User Datagram Protocol (UDP) source port, and a UDP destination port as the first and second portions of the corresponding layer 3 information.

13. The method of claim 12, wherein the step of generating a packet signature includes:

selecting the at least two of an IP source address, an IP destination address, a Transmission Control Protocol (TCP) source port, a TCP destination port, a User Datagram Protocol (UDP) source port, and a UDP destination port as the first and second portions of the corresponding layer 3 information in the received data packet;

generating third and fourth hash keys for the first and second portions of the corresponding layer 3 information in the received data packet based on the prescribed hash operation; and combining the third and fourth keys to form the packet signature.

14. The method of claim 11, wherein the step of identifying one of the layer 3 switching entries includes:

searching a signature table within the integrated network switch for one of the entry signatures matching the packet signature;

retrieving from the signature table an address location of the one layer 3 switching entry corresponding to the matched entry signature; and accessing the one layer 3 switching entry from an external memory based on the retrieved address location.

15. The method of claim 14, wherein the step of identifying the one layer 3 switching entry includes verifying that the one layer 3 switching entry matches the received data packet.

16. An integrated network switch configured for executing layer 3 switching decisions, comprising:

an index table that includes addresses of layer 3 switching entries that identify respective data packet types based on layer 3 information, the index table also including for each address entry a corresponding entry signature representing a combination of selected first and second portions of the corresponding layer 3 information hashed according to a prescribed hashing operation;

a plurality of network switch ports, each comprising:

(1) a frame identifier configured for obtaining the first and second portions of layer 3 information within a data packet being received by the network switch port, and (2) a flow module configured for generating a packet signature by generating first and second hash keys for the first and second portions from the data packet based on a prescribed hash operation, the flow module identifying one of the layer 3 switching entries for execution of the corresponding layer 3 switching decision for the data packet based on a determined correlation between the packet signature and the corresponding entry signature; and layer 3 switching logic for executing the layer 3 switching decision for the data packet based on the corresponding identified one layer 3 switching entry;

wherein the integrated network switch is implemented on a single chip.

17. The switch of claim 16, wherein the flow module, in response to determining the correlation between the packet signature and the entry signature, fetches selected portions of the layer 3 information from the one layer 3 switching entry for verification that the one layer 3 switching entry matches the data packet.

18. The switch of claim 16, wherein the frame identifier selects at least two of an IP source address, and IP destination address, a Transmission Control Protocol (TCP) source port, a TCP destination port, a User Datagram Protocol (UDP) source port, and a UDP destination port as the first and second portions of layer 3 information within the data packet.

19. The switch of claim 16, further comprising an external memory interface configured for providing access by the flow module to the one layer 3 switching entry, stored in a memory external to the integrated network switch, based on the corresponding address entry.

20. The switch of claim 16, wherein the flow module is configured for generating the packet signature based on combining the first and second hash keys.

* * * * *